(12) United States Patent
Sakaguchi et al.

(10) Patent No.: US 6,302,981 B1
(45) Date of Patent: Oct. 16, 2001

(54) METHOD OF MANUFACTURING A WATERPROOF STRUCTURE FOR ELECTRIC WIRE DRAWOUT PORTION

(75) Inventors: Tadahisa Sakaguchi; Naoki Ito; Akira Shinchi, all of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/519,862

(22) Filed: Mar. 6, 2000

Related U.S. Application Data

(62) Division of application No. 08/996,398, filed on Dec. 22, 1997, now Pat. No. 6,129,576.

(30) Foreign Application Priority Data

Dec. 24, 1996 (JP) .................................................. 8-343594

(51) Int. Cl.[7] .................................................. B32B 31/16
(52) U.S. Cl. ...................... 156/73.1; 156/290; 156/308.4
(58) Field of Search .............................. 156/47, 55, 73.1, 156/290, 292, 308.2, 308.4

(56) References Cited

U.S. PATENT DOCUMENTS

| 3,518,617 | 6/1970 | Bosworth et al. ............... 439/465 |
| 4,225,205 | 9/1980 | Sinclair et al. ................. 439/465 |
| 4,606,596 | 8/1986 | Whiting et al. ................. 439/467 |
| 5,785,544 | 7/1998 | Linden et al. .................. 439/278 |
| 5,857,259 | 1/1999 | Johnston ........................ 439/492 |
| 6,129,576 | * 10/2000 | Sakaguchi et al. ............ 439/465 |

FOREIGN PATENT DOCUMENTS

| 0048930 A1 | 9/1981 | (EP) . |
| 9727205 | 5/1998 | (GB) . |
| 50-54591 | 5/1975 | (JP) . |
| 5-57772 | 7/1993 | (JP) . |

* cited by examiner

Primary Examiner—James Sells
(74) Attorney, Agent, or Firm—Finnegan, Henderson, Farabow, Garrett & Dunner, L.L.P.

(57) ABSTRACT

A waterproof structure for an electric wire drawout portion is low in manufacturing cost and enhanced in waterproofness. A cover portion is formed on an end portion of a housing and on this cover portion there is mounted a lower rubber-like elastic member. An upper cover portion is welded to the cover portion by ultrasonic oscillation and on the upper cover portion there is mounted an upper rubber-like elastic member brought into pressure contact with the lower rubber-like elastic member and an electric wire. On the cover portion and the upper cover portion there are integrally formed lower and upper projections exposed on surfaces of the lower and the upper rubber-like elastic member. When welded together by the ultrasonic oscillation, the upper and the lower rubber-like elastic member are closely contacted with each other in a state of their being compressed and simultaneously the upper and the lower rubber-like elastic member are closely contacted with the electric wire, the cover portion and the upper cover portion and the projections are welded to each other.

10 Claims, 5 Drawing Sheets

METHOD OF MANUFACTURING A WATERPROOF STRUCTURE FOR ELECTRIC WIRE DRAWOUT PORTION

This is a division of application Ser. No. 08/996,398, filed Dec. 22, 1997, U.S. Pat. No. 6,129,576 all of which is incorporated herein by reference.

BACKGROUND OF THE INVENTION

1. Field of the Invention

The present invention relates to a method of manufacturing a waterproof structure for an electric wire drawout portion and, more particularly, to a structure for waterproofing an electric wire drawout portion of a wiring accessory such as a waterproof connector, an electric connection box or the like by means of a rubber-like elastic member and a method of manufacturing such the structure.

2. Description of Relevant Art

In FIGS. 1A and 1B through 4, a conventional example of a waterproof structure for an electric drawout portion of a waterproof connector is shown.

A waterproof structure shown in FIGS. 1A and 1B is of a type wherein in a state where electric wires 7 are clamped by two split upper and lower rubber plugs 30 shown in FIG. 1A and fitted in grooves 31 of the rubber plugs 30 and the resulting rubber plugs 30 are forcedly inserted into a concave portion 32 of a housing 2 of the connector as shown in FIG. 1B (see Japanese Utility Model Application Laid-Open Publication No. 50-54591).

Also, a waterproof structure shown in FIGS. 2A and 2B is of a type wherein holders 33 are freely slidably mounted on a housing of the connector as shown in FIG. 2A and packings 34 are pressed by the holders 33 from above and below electric wires 7 as shown in FIG. 2B (see Japanese Utility Model Application Laid-Open Publication No. 5-57772).

Further, there is also known a waterproof structure wherein as shown in FIG. 3A electric wires 7 are clamped by two split rubber plugs 36 and the rubber plugs 36 are clamped by similarly two split resin-made housings 2 and 2, whereby the housings 2 and 2 are welded to each other by ultrasonic waves being oscillated by an ultrasonic horn 22 with a load being applied to the housing 2 and with the rubber plugs 36 being thereby compressed.

The waterproof structure shown in FIGS. 1A and 1B can collectively waterproof a plurality of the electric wires 7. However, an operation of fitting the rubber plugs 30 into the housing 7 is troublesome and in addition it is necessary to form the rubber plug 30 by replacing the mold in correspondence with the size of the electric wire and the number of the poles, raising the problem that the manufacturing cost becomes high.

Also, the waterproof structure shown in FIGS. 2A and 2B enables the performance of the sealing operation of the packings 34 relatively easily and can cope with the difference in size of the electric wires and the difference in number of the poles to some extent. However, as the packings 34 are only pressed by the holders 33, it is unavoidable that as shown in FIG. 4 gaps 35 are produced at side portions of the electric wire 7 between the packings 34 and 34, raising the problem that the waterproofness deteriorates.

Also, in the waterproof structure shown in FIGS. 3A and 3B, as the welding portions 37 are only two in number, i.e., on both sides of the housing 2, central parts of the housings 2 are deformed as shown in FIG. 3B by the repulsion of the rubber plugs 36, with the result that the gaps 35 are none the less produced as shown in FIG. 4, raising the problem that the waterproofness deteriorates.

SUMMARY OF THE INVENTION

The present invention has been achieved with such points in view.

It therefore is an object of the present invention to provide a waterproof structure for an electric wire drawout portion which can be manufactured at a low cost and has an enhanced waterproofness and a method of manufacturing such the waterproof structure.

To achieve the object, a first aspect of the invention provides a waterproof structure for an electric wire drawout portion adapted to cover an electric wire drawn out from a housing of an electric wiring accessory by rubber-like elastic members to thereby waterproof the electric wire, wherein with respect to the upper cover portion and the cover portion there are mounted the upper and the lower rubber-like elastic member respectively having the accommodation grooves through which the electric wire passes and the upper and the lower welding member exposed on the respective surfaces of the upper and the lower rubber-like elastic member and welded to each other, whereby by oscillation of ultrasonic waves the upper cover portion and the cover portion are welded to each other, the upper and the lower welding member are welded to each other, and the upper cover portion and the cover portion are thereby made close to each other to thereby cause the electric wire to be accommodated in the accommodation grooves of the upper and the lower rubber-like elastic member compressed between the upper cover portion and the cover portion by welding the respective ambient portions of the accommodation grooves to each other.

According to the first aspect, the electric wire is sealed in a state of its being compressed by the upper and the lower rubber-like elastic member and is brought to a state where a pressure has been applied onto the electric wire from an entire circumference thereof. Therefore, the gaps cease to be produced around the electric wire, with the result that a complete waterproofing is obtained. Also, since the cover portion and the upper cover portion are welded and fixed together at intermediate portions of the welding members, the cover portion and the upper cover portion can be prevented from being deformed by the repulsions of the rubber-like elastic members.

Accordingly, even in the case of an electric connection box or the like which is of a multi-pole and large-width structure, the waterproofness will not be impaired.

A second aspect of the invention provides a waterproof structure for an electric wire drawout portion, wherein the upper and the lower welding member are partitioning plates formed on the upper cover portion and the cover portion; and the upper and the lower rubber-like elastic member are fitted between the partitioning plates.

According to the second aspect, the partitioning plates are welded to each other, whereby the cover portion and the upper cover portion are prevented from being deformed; and the upper and the lower rubber-like elastic member can be easily mounted by being fitted between the partitioning plates.

A third aspect of the invention provides a waterproof structure for an electric wire drawout portion, wherein in the upper and the lower rubber-like elastic member there are formed the accommodation grooves partitioned by the ribs;

and the upper and the lower welding member are the projections exposed on the surfaces of the ribs.

According to the third aspect, the cover portion and the upper cover portion can be prevented from being deformed by mutual welding of the projections.

A fourth aspect of the invention provides a waterproof structure for an electric wire drawout portion, wherein the housing is the connector housing.

According to the fourth aspect of the invention, the electric wire drawout portion of the connector can effectively be waterproofed.

A fifth aspect of the invention provides a manufacturing method of manufacturing a waterproof structure for an electric wire drawout portion adapted to cover an electric wire drawn out from a housing of an electric wiring accessory by rubber-like elastic members to thereby waterproof the electric wire, the manufacturing method comprising the steps of causing the electric wire to be drawn out from the housing and thereafter setting this electric wire in an accommodation groove of a lower rubber-like elastic member provided on a cover portion on a front portion of the housing, setting an upper cover portion on the cover portion, thereby setting an upper rubber-like elastic member provided on the upper cover portion on the lower rubber-like elastic member, and setting an ultrasonic horn on the upper cover and applying a load on the upper cover portion while causing the ultrasonic horn to oscillate ultrasonic waves, thereby welding the cover portion and the upper cover portion to each other and welding to each other the lower and the upper welding member respectively integrally formed on the cover portion and the upper cover portion.

According to the fifth aspect, there is adopted a method of applying vibration and pressure by an ultrasonic horn in a state where the rubber-like elastic members are clamped by the cover portion and the upper cover portion. Therefore, the mutual compression of the rubber-like elastic members, the mutual welding of the both cover portions and the mutual welding of the welding members are performed by the same step, with the result that the manufacturing operation is simplified. Besides, the cover portion and the upper cover portion are welded and fixed together also at the intermediate portions thereof by the welding members. As a result, the cover portion and the upper cover portion are prevented from being deformed by the repulsions of the rubber-like elastic members and so it is possible to manufacture a waterproof structure for an electric wire drawout portion having a high reliability.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1A:
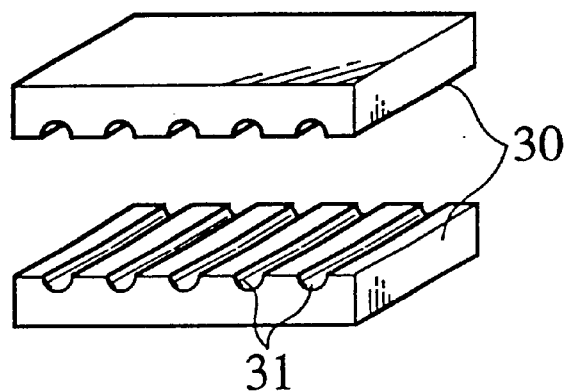
FIGS. 1A and 1B show a conventional waterproof connector, FIG. 1A being a perspective view of rubber plugs and FIG. 1B being a perspective view of a mounted state thereof into the connector.
Figure 1B:
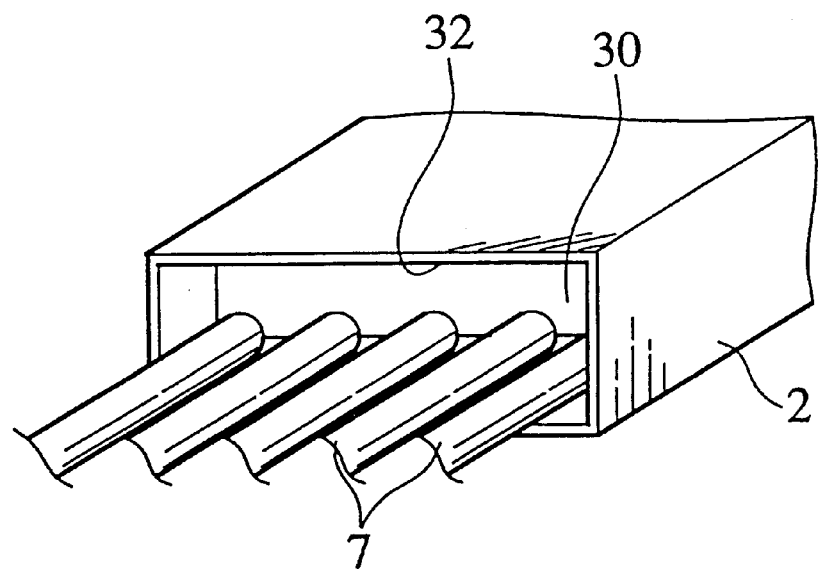
Figure 2A:
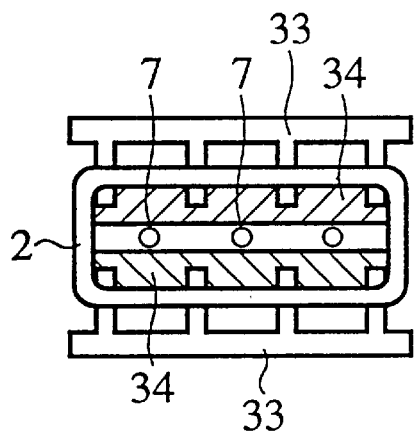
FIGS. 2A and 2B are sections of another conventional waterproof connector, FIG. 2A showing a temporarily retained state and FIG. 2B showing a permanently retained state.
Figure 2B:
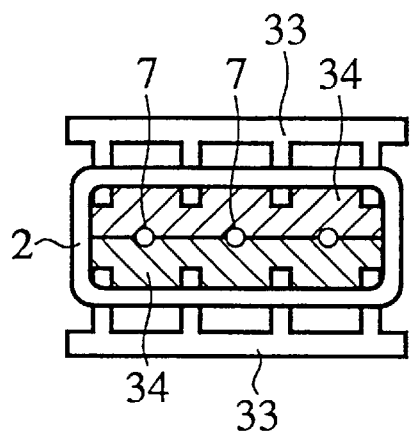
Figure 3A:
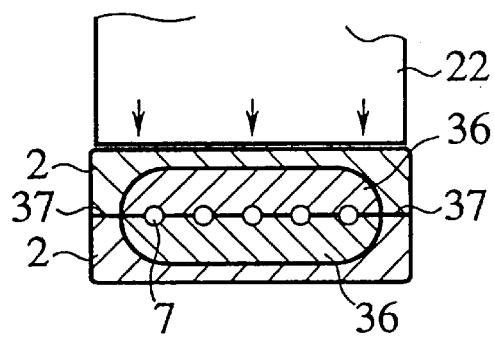
FIGS. 3A and 3B are sections of still another conventional waterproof connector, FIG. 3A showing a process of manufacture and FIG. 3B showing the function after manufacture.
Figure 3B:
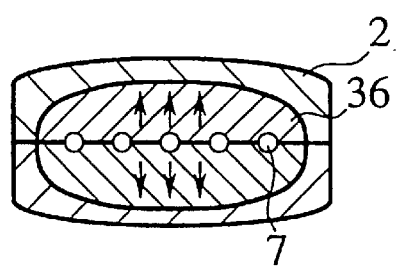
Figure 4:
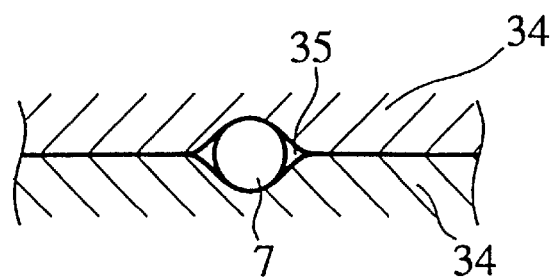
FIG. 4 is a section showing the function of the conventional waterproof structure.

The contents of U.S. Pat. No. 5,584,122 are incorporated herein by reference.

There will be detailed below the preferred embodiments of the present invention with reference to the accompanying drawings. Like members are designated by like reference characters.

Figure 5:
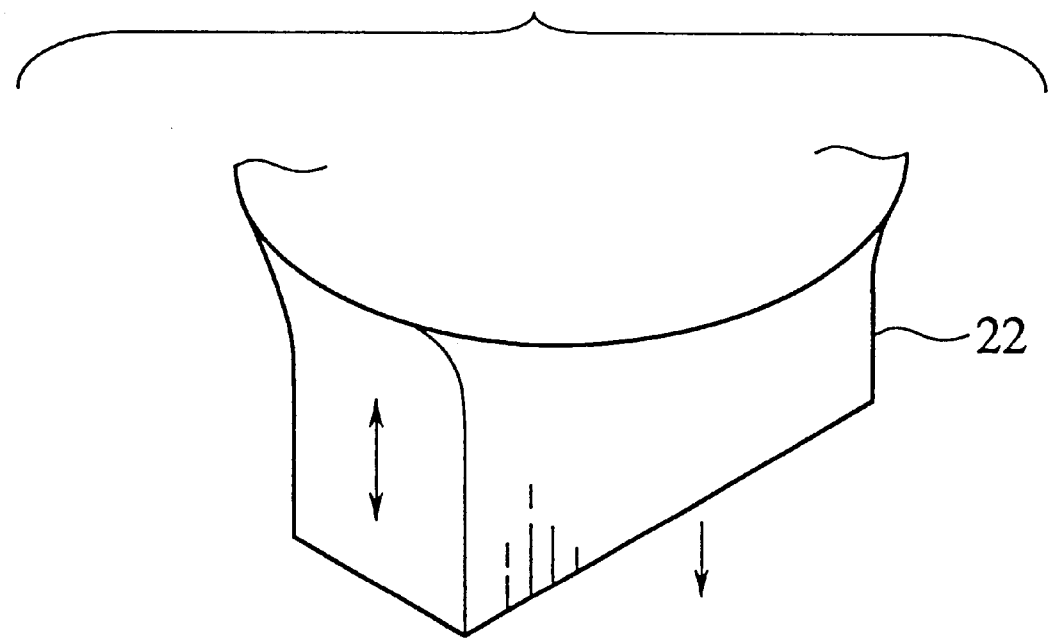
FIG. 5 is a perspective view of a manufacturing process of a waterproof structure for an electric wire drawout portion according to a first embodiment of the present invention.
Figure 5:
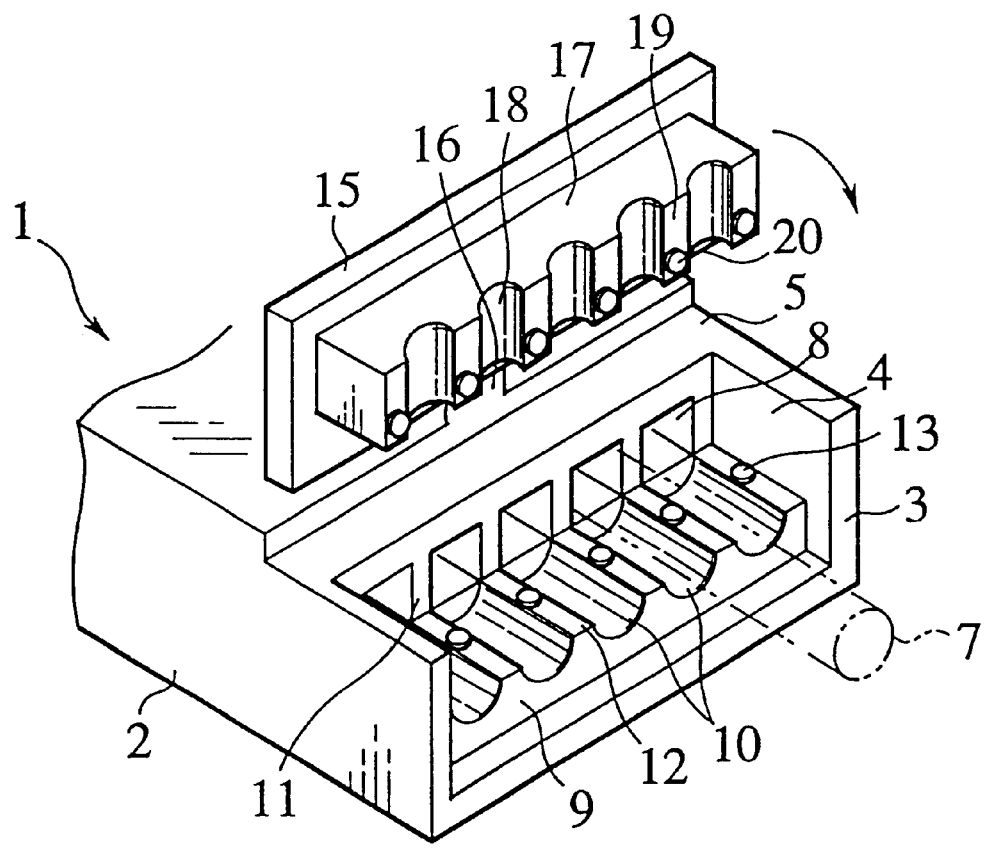
Figure 6:
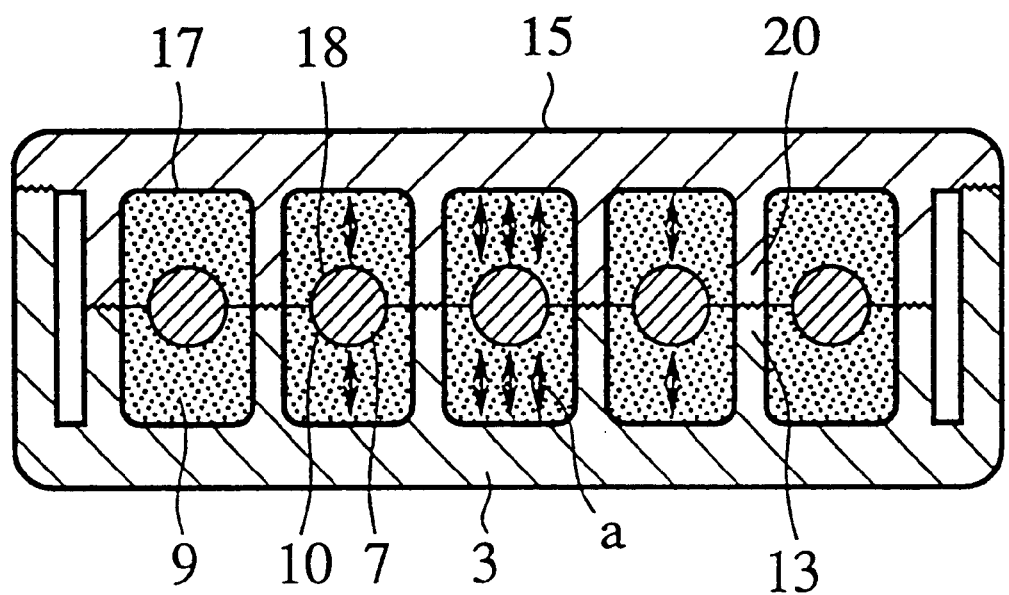
FIG. 6 is a section, after completed, of the first embodiment.

FIGS. 5 and 6 show a waterproof structure for an electric wire drawout portion according to a first embodiment of the present invention, which is an example wherein the invention has been applied to an electric wire drawout portion of a connector.

A connector 1 is constituted by a housing 2 shaped like a rectangular parallelopiped and a cover portion 3 formed on a forward end of the housing 2 and is made as a whole of plastic material. With respect to a base portion of the cover portion 3 there is formed a level difference portion 5, and in a front portion of the level difference portion 5 there is formed a concave portion 4.

In a rear surface of the concave portion 4 there are made open a plurality of holes 8 through which electric wires 7 (see FIG. 6) passing within the housing 2 are drawn out. On a bottom portion of the concave portion there is mounted a lower rubber-like elastic member 9. In the lower rubber-like elastic member 9 there are formed upwardly oriented semi-circular accommodation grooves 10 in correspondence with the respective holes 8. These semi-circular accommodation grooves 10 are partitioned by flat ribs 12 corresponding to partitioning walls 11 for partitioning the respective holes 8. On the bottom portion of the concave portion 4 there are integrally formed lower projections serving as welding members. These projections 13 are passed through the ribs 12, respectively, to be exposed on inner surfaces of the ribs 12.

An upper cover portion 15 is a plate-like member integrally mounted on a front end edge of the housing 2 through a flexible connection portion 16. On a front surface of the upper cover portion 15 there is mounted an upper rubber-like elastic member 17. With respect to this upper rubber-like elastic member 17 also, there are formed semi-circular accommodation grooves 18 and ribs 19 each having the same configuration. Through the ribs 19 also, there are passed upper projections 20 serving as welding members which have been formed integrally with the upper cover 15 at positions corresponding to the ribs 12. It is to be noted that the upper cover portion 15 may be formed separately from the housing 2.

In order to pass the lower projections 13 and the upper projections 20 through the ribs 12 and the ribs 19, respectively, the lower and the upper rubber-like member 9, 17 may be formed by integral molding thereof with the cover portion 3 and the upper cover portion 15, respectively, so as to cause the lower and the upper projections 13, 20 to be exposed on the surfaces of the ribs 12, 19, or, in a case where the lower and the upper rubber-like elastic member 9, 17 are after mounted, through-holes may be previously formed in the ribs 12, 19 of the rubber-like elastic members 9, 17 so as to enable these ribs 12, 19 thereof to be inserted onto the lower and the upper projections 13, 20. Further, the lower and the upper projections 13, 20 may be situated at any positions in the longitudinal direction of the ribs 12, 19 and are not needed to be provided with respect to all ribs 12, 19 and may be only provided with respect to at least central ribs thereof.

The material of the both rubber-like elastic members 9, 17 is not limited in particular if it is natural rubber, synthetic rubber or other rubber-like materials (elastomer) having elasticity.

Next, manufacturing steps of the waterproof structure for the electric wire drawout portion of the first embodiment will be explained (see FIG. 6).

(1) Terminals (not shown) connected to the electric wires 7 are retained within the housing 2, whereby the electric wires 7 are drawn out from the holes 8 along the semi-circular accommodation grooves 10.

(2) Subsequently, the upper cover 15 is rotated in an arrow-indicated direction of FIG. 5, whereby the electric wires 7 are clamped from above and below by the semi-circular accommodation grooves 10, 18 of the lower and the upper rubber-like elastic member 9, 17. In order to cause the rubber-like elastic members 9, 17 to apply a compression force to the electric wires 7 at this time, the semi-circular accommodation grooves 10, 18 are formed so that the diameter of circular accommodation holes formed by these semi-circular accommodation grooves 10, 18 may be smaller than the size of the electric wires 7.

(3) An ultrasonic horn 22 is lowered and ultrasonic waves are oscillated while a load is being applied onto the upper cover portion 15. As a result of this, the level difference portion 5 and peripheral edge portion of the cover portion 3 and the peripheral edge portion of the upper cover portion 15 are welded to each other while, on the other hand, the lower projections 13 of the cover portion 3 and the upper projections 20 of the upper cover portion 15 are welded to each other. It is to be noted that, ordinarily, as rubber absorbs the vibrations of the ultrasonic waves, the rubber-like elastic member 9 and the rubber-like elastic member 17 are not welded to each other.

As a result of this, as the electric wires 7 are sealed in a state where the lower and the upper rubber-like elastic member 9, 17 are compressed as shown in FIG. 6 and are brought to a state where a pressure has been applied onto each electric wire 7 from the entire circumference thereof due to the restoring force (a) of the compressed rubber-like elastic members 9, 17, no gap is produced around the electric wire 7 and the both rubber-like elastic members 9, 17 are also closely contacted with the cover portion 3 and the upper cover portion 15 due to the restoring force (a) thereof, whereby a complete waterproofness is obtained. Further, as the cover portion 3 and the upper cover 15 are not only welded and fixed together at their peripheral edge portions but are also welded and fixed together at their intermediate positions by mutual welding of the projections 13, 20, it is possible to prevent the cover portion 3 and the upper cover portion 15 from being deformed due to the repulsions of the rubber-like elastic members 9, 17.

Figure 7:
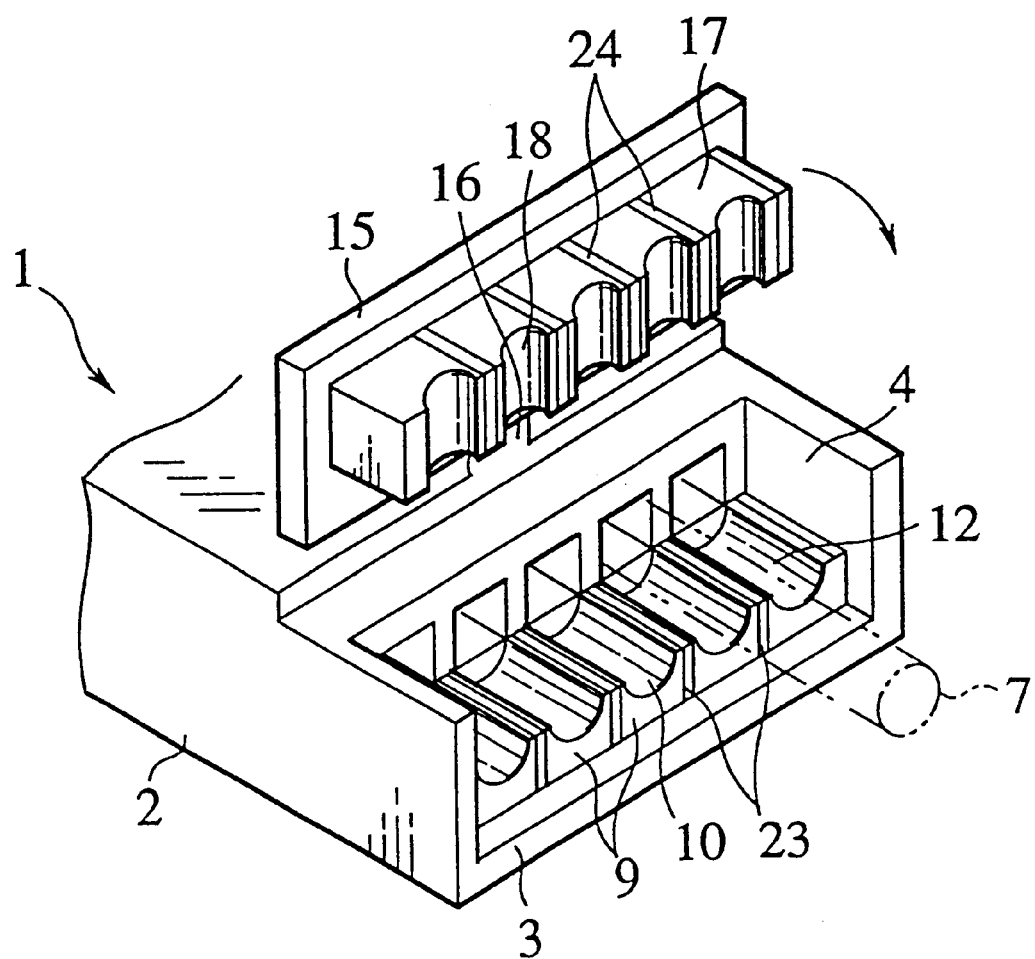
FIG. 7 is a perspective view of a manufacturing process of a second embodiment of the present invention.

FIG. 7 shows a second embodiment of the present invention, wherein the welding members constituted by partitioning plates are provided in place of the lower and the upper rubber-like elastic member 13, 20 of the first embodiment.

Namely, partitioning plates 23, 24 are formed on the cover portion 3 and the upper cover portion 15, whereby rubber-like elastic members 9, 17 are fitted between the partitioning plates 23 and between the partitioning plates 24 and these partitioning plates 23, 24 are exposed on the inner surfaces of ribs 12, 19 respectively.

In this second embodiment also, the upper endface and lower endface of the partitioning plates 23, 24 are welded together and thereby prevent the cover portion 3 and the upper cover portion 15 from being deformed. Also, as the welding area becomes large compared to the above-mentioned projections 13, 20, the cover portion 3 and the upper cover portion 15 are more firmly welded and fixed together. Further, in a case where the lower and the upper rubber-like elastic member 9, 17 are after mounted onto the cover portion 3 and the upper cover portion 15, it is sufficient that the members 9, 17 be only fitted between the partitioning plates 23 and between the partitioning plates 24 and therefore the mounting operation is easily compared to the inserting operation of inserting the members 9, 17 onto the projections 13, 20.

Although in each of the above-described embodiments there has been shown an example wherein the invention has been applied to the connector, the invention is not limited thereto and can be applied to an electric connection box and any other wiring accessory having an electric-wire drawout portion.

While preferred embodiments of the present invention have been described using specific terms, such description is for illustrative purposes, and it is to be understood that changes and variations may be made without departing from the spirit or scope of the following claims.

What is claimed is:

1. A method of manufacturing a waterproof structure for an electric wire drawout portion adapted to cover an electric wire extending from a housing of an electric wire accessory by rubber-like elastic members to thereby waterproof the electric wire, the manufacturing method comprising the steps of:

causing the electric wire to be drawn out from the housing and thereafter setting this electric wire in an accommodation groove of a lower rubber-like elastic member provided on a cover portion on a front portion of the housing;

setting an upper cover portion on the cover portion, thereby setting an upper rubber-like elastic member provided on the upper cover portion on the lower rubber-like elastic member; and setting an ultrasonic horn on the upper cover and applying a load on the upper cover portion while causing the ultrasonic horn to oscillate ultrasonic waves, thereby welding the cover portion and the upper cover portion to each other and welding to each other a lower and an upper welding member respectively integrally formed on the cover portion and the upper cover portion.

2. A method of manufacturing a waterproof structure for an electric-wire drawout portion comprising the steps of:

providing a housing of an electric wire accessory having a cover portion, an upper cover portion mounted onto the cover portion, and at least one electric wire extending from between the cover portion of the housing and the upper cover portion;

providing an upper rubber-like elastic member mounted on the upper cover portion, the upper rubber-like elastic member having at least one upper accommodation groove configured to accommodate a first portion of an electric wire, and at least one upper surface adjacent to the upper accommodation groove;

providing an upper welding member extending from the upper surface of the upper rubber-like elastic member;

providing a lower rubber-like elastic member mounted on the cover portion, the lower rubber-like elastic member having at least one lower accommodation groove configured to accommodate a second portion of the electric wire, and at least one lower surface adjacent to the lower accommodation groove;

providing a lower welding member extending from the lower surface of the lower rubber-like elastic member;

compressing the upper rubber-like elastic member and the lower rubber-like elastic member together while the electric wire is accommodated between the upper and lower accommodation grooves; and sealing the upper welding member of the upper rubber-like elastic member and the lower welding member of the lower rubber-like elastic member together.

3. The method of claim 2, wherein the step of sealing includes the substep of providing an ultrasonic device for ultrasonically welding the upper welding member to the lower welding member.

4. The method of claim 2, wherein the step of providing an upper welding member includes the substep of providing an upper partitioning plate extending from the upper cover portion, and the step of providing a lower welding member includes the substep of providing a lower partitioning plate extending from the cover portion.

5. The method of claim 4, wherein the upper partitioning plate protrudes from the upper surface of the rubber-like elastic member and the lower partitioning plate protrudes from the lower surface of the rubber-like elastic member so that an upper end face of the upper partitioning plate contacts a lower end face of the lower partitioning plate during the step of compressing.

6. The method of claim 4, wherein the step of sealing includes the substep of sealing an upper end face of the upper partitioning plate to a lower end face of the lower partitioning plate.

7. The method of claim 2, wherein the step of sealing occurs during the step of compressing.

8. The method of claim 2, wherein the upper surface of the upper rubber-like elastic member extends along a rib adjacent to the upper accommodation groove, and the lower surface of the lower rubber-like elastic member extends along a rib adjacent to the lower accommodation groove.

9. The method of claim 2, wherein the step of sealing includes the substep of fixing an upper peripheral edge portion of the upper cover to a lower peripheral edge portion of the cover portion.

10. The method of claim 2, wherein the upper welding member is located at an intermediate position of the upper surface and the lower welding member is located at an intermediate position of the lower surface such that intermediate positions of the cover portion and the upper cover are fixed together during the step of sealing.

* * * * *